(12) United States Patent
Hayashi (10) Patent No.: US 10,308,077 B2
(45) Date of Patent: Jun. 4, 2019

(54) PNEUMATIC TIRE

(71) Applicant: BRIDGESTONE CORPORATION, Chuo-ku, Tokyo (JP)

(72) Inventor: Shintaro Hayashi, Hachioji (JP)

(73) Assignee: BRIDGESTONE CORPORATION, Chuo-ku, Tokyo (JP)

(*) Notice: Subject to any disclaimer, the term of this patent is extended or adjusted under 35 U.S.C. 154(b) by 181 days.

(21) Appl. No.: 15/504,756

(22) PCT Filed: Aug. 7, 2015

(86) PCT No.: PCT/JP2015/003983
§ 371 (c)(1),
(2) Date: Feb. 17, 2017

(87) PCT Pub. No.: WO2016/031158
PCT Pub. Date: Mar. 3, 2016

(65) Prior Publication Data
US 2017/0253089 A1 Sep. 7, 2017

(30) Foreign Application Priority Data
Aug. 29, 2014 (JP) .................. 2014-176212

(51) Int. Cl.
*B60C 11/04* (2006.01)
*B60C 11/12* (2006.01)
(Continued)

(52) U.S. Cl.
CPC ............ *B60C 11/042* (2013.01); *B60C 11/01* (2013.01); *B60C 11/03* (2013.01);
(Continued)

(58) Field of Classification Search
CPC ... B60C 11/125; B60C 11/0304; B60C 11/01; B60C 11/03; B60C 11/12; B60C 11/13;
(Continued)

(56) References Cited

U.S. PATENT DOCUMENTS

2013/0292021 A1 11/2013 Tanaka

FOREIGN PATENT DOCUMENTS

| CN | 203727105 U | 7/2014 |
|---|---|---|
| CN | 203780229 U | 8/2014 |

(Continued)

OTHER PUBLICATIONS

Machine translation of JP62-299407 (no date).*
(Continued)

*Primary Examiner* — Steven D Maki
*Assistant Examiner* — Philip N Schwartz
(74) *Attorney, Agent, or Firm* — Kenja IP Law PC (57) ABSTRACT

This pneumatic tire includes, on a tread surface, land portions defined by tread edges and by circumferential main grooves extending continuously in the tread circumferential direction; central sipes, in a central land portion on a tire equatorial plane, extending in the tread width direction and formed at a predetermined pitch length, the central land portion being continuous in the tread circumferential direction between adjacent central sipes; and intermediate sipes, in intermediate land portions adjacent to the central land portion on both sides in the tread width direction with the circumferential main grooves therebetween, extending in the tread width direction and being formed at a predetermined pitch length, each intermediate land portion being continuous in the tread circumferential direction between adjacent intermediate sipes. The pitch length of the intermediate sipes is longer than that of the central sipes, and both ends of the central sipes open into the circumferential main grooves.

7 Claims, 2 Drawing Sheets

(51) Int. Cl.
  *B60C 11/01* (2006.01)
  *B60C 11/03* (2006.01)
  *B60C 11/13* (2006.01)
(52) U.S. Cl.
  CPC .......... *B60C 11/0306* (2013.01); *B60C 11/12* (2013.01); *B60C 11/1204* (2013.01); *B60C 11/124* (2013.01); *B60C 11/1236* (2013.01); *B60C 11/1272* (2013.01); *B60C 11/13* (2013.01); *B60C 11/1384* (2013.01); *B60C 2011/0341* (2013.01); *B60C 2011/0388* (2013.01); *B60C 2011/1295* (2013.01)
(58) Field of Classification Search
  CPC . B60C 11/042; B60C 11/124; B60C 11/0306; B60C 11/1384; B60C 11/1236; B60C 11/1204; B60C 11/1272; B60C 2011/1295; B60C 2011/0388; B60C 2011/0341
  See application file for complete search history.

(56) References Cited

FOREIGN PATENT DOCUMENTS

| | | |
|---|---|---|
| EP | 2913203 A1 | 9/2015 |
| EP | 2990231 A1 | 3/2016 |
| JP | S62157807 A | 7/1987 |
| JP | S62299407 A | 12/1987 |
| JP | 1034831 S | 3/1999 |
| JP | 2003159910 A | 6/2003 |
| JP | 2003159911 A | 6/2003 |
| JP | 2009061985 A | 3/2009 |
| JP | 2009090874 A | 4/2009 |
| JP | 2010162989 A | 7/2010 |
| JP | 2010208503 A | 9/2010 |
| JP | 2011140248 A | 7/2011 |
| JP | 2012086665 A | 5/2012 |
| JP | 2013193464 A | 9/2013 |
| WO | 2014092078 A1 | 6/2014 |
| WO | 2014175102 A1 | 10/2014 |

OTHER PUBLICATIONS

Machine translation of JP2012-086665 (no date).*
Oct. 23, 2017, Search Result of Office Action issued by the State Intellectual Property Office in the corresponding Chinese Patent Application No. 201580046796.7.
Aug. 30, 2017, Search Result of Extended European Search Report issued by the European Patent Office in the corresponding European Patent Application No. 15835096.7.

* cited by examiner

PNEUMATIC TIRE

TECHNICAL FIELD

This disclosure relates to a pneumatic tire.

BACKGROUND

Conventionally, in order to improve the steering stability of pneumatic tires, methods have been adopted such as providing a so-called central land portion, which is formed near the tire equatorial plane, with a ribbed shape (for example, see JP 2013-193464 A (PTL 1)).

CITATION LIST

Patent Literature

PTL 1: JP 2013-193464 A

SUMMARY

Technical Problem

In the pneumatic tire disclosed in PTL 1, however, the rigidity of the central land portion increases, thereby decreasing the grounding property. This may result in a reduction of the initial steering responsiveness, which is the responsiveness at the moment when the steering wheel is turned. Also, in the pneumatic tire of PTL 1, the pitch length of the grooves and sipes formed in the intermediate land portions at both sides of the central land portion is shorter than the pitch length of the grooves and sipes formed in the central land portion. Therefore, sufficient rigidity cannot be obtained in the intermediate land portions, which may lead to insufficient steering stability during cornering.

Therefore, it would be helpful to provide a pneumatic tire that makes the initial steering responsiveness compatible with the steering stability during cornering.

Solution to Problem

A summary of this disclosure is as follows.

My pneumatic tire comprises: on a tread surface, a plurality of circumferential main grooves, extending continuously in a tread circumferential direction, and a plurality of land portions defined by the circumferential main grooves and tread edges; central sipes, in a central land portion formed on a tire equatorial plane, extending in a tread width direction and being formed at a predetermined pitch length, the central land portion being continuous in the tread circumferential direction between adjacent central sipes; and intermediate sipes, in intermediate land portions adjacent to the central land portion on both sides in the tread width direction with the circumferential main grooves therebetween, extending in the tread width direction and being formed at a predetermined pitch length, each intermediate land portion being continuous in the tread circumferential direction between adjacent intermediate sipes; wherein the pitch length of the intermediate sipes is longer than the pitch length of the central sipes; and wherein both ends of the central sipes open into the circumferential main grooves.

The "tread surface" refers to the entire outer circumferential surface of the tire that comes into contact with the road surface when the tire is attached to an applicable rim, filled to a prescribed internal pressure, and rolled while being placed under a load corresponding to the maximum load capability. As used herein, an "applicable rim" refers to a standard rim specified by the standards below in accordance with tire size ("Design Rim" in the YEAR BOOK of the below-mentioned TRA, and "Measuring Rim" in the STANDARDS MANUAL of the below-mentioned ETRTO), "prescribed internal pressure" refers to air pressure specified by the standards below in accordance with the maximum load capability, and the "maximum load capability" refers to the maximum mass that the tire is allowed to bear according to the standards below. The standards are determined by valid industrial standards for the region in which the tire is produced or used, such as the "YEAR BOOK" of the "Tire And Rim Association, Inc." (TRA) in the United States of America, the "STANDARDS MANUAL" of the "European Tyre and Rim Technical Organisation" (ETRTO) in Europe, and the "JATMA YEAR BOOK" of the "Japan Automobile Tyre Manufacturers Association" (JATMA) in Japan.

The "groove" refers to an opening with a width of greater than 1.5 mm that opens to the tread surface when the pneumatic tire is mounted on an applicable rim and filled to prescribed internal pressure, with no load applied. On the other hand, a "sipe" is a thin cut, inward from the surface of the land portion, such that the width of the opening to the tread surface is 1.5 mm or less, preferably 1 mm or less, and even more preferably 0.7 mm or less when the pneumatic tire is mounted on an applicable rim and filled to prescribed internal pressure, with no load applied (when the sipe has a chamfered portion, the width refers to the width of the opening to the chamfered portion).

"Extending in the tread width direction" does not refer to "extending in exactly the tread width direction" but refers to extending in a direction having a component in the tire width direction.

Stating that the circumferential main grooves "extend continuously in the tread circumferential direction" refers to extending continuously towards the tread circumferential direction and includes the cases of extending continuously towards the tread circumferential direction in a zigzag shape and of extending towards the tread circumferential direction while curving.

The "tread edge" refers to the outermost position in the tread width direction of the aforementioned "tread surface."

Among the opening positions of the sipes to the tread surface, the "pitch length" of the sipes refers to the length between opening positions on the same side in the tread circumferential direction.

The below-described amount of chamfering of the chamfered portion refers to the dimension in the tire circumferential direction of the chamfered portion. When the dimension in the tire circumferential direction changes along the tire width direction, the amount of chamfering refers to the average value of the dimension in the tire circumferential direction.

The below-described statement "be continuous smoothly" refers to how a line that is an extension of a center line in the sipe width direction near one tread width direction edge of the sipe (including the chamfered portion) and the lug groove is positioned within the other tread width direction edge (the opening to the circumferential main groove) of the sipe (including the chamfered portion) and the lug groove.

Advantageous Effect

According to this disclosure, it is possible to provide a pneumatic tire that makes the initial steering responsiveness compatible with the steering stability during cornering.

DETAILED DESCRIPTION

The following describes embodiments of this disclosure in detail with reference to the drawings.

Figure 1:
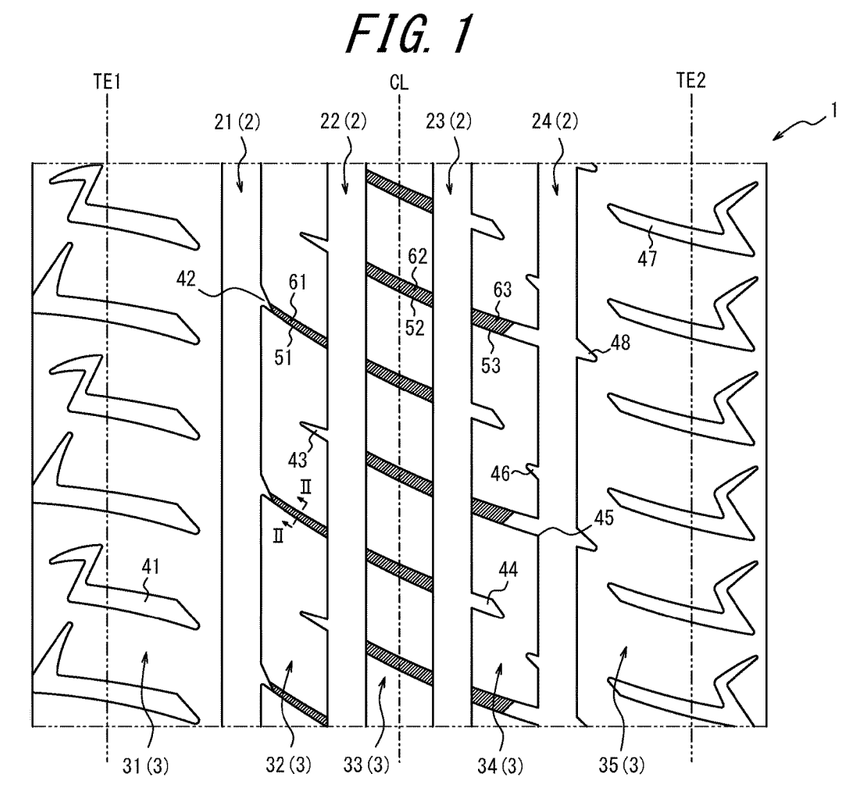
FIG. 1 is a developed view illustrating a tread pattern of the pneumatic tire according to one of the disclosed embodiments.

FIG. 1 is a developed view illustrating a tread pattern of the pneumatic tire (also referred to below simply as a tire) according to one of the embodiments of this disclosure, illustrating the tread surface when the tire is mounted on an applicable rim and filled to prescribed internal pressure, with no load.

As illustrated in FIG. 1, the tire according to one of the embodiments of this disclosure has a plurality of circumferential main grooves 2 extending continuously in the tread circumferential direction formed on the tread surface 1. In the example in FIG. 1, the tire has four circumferential main grooves 21, 22, 23, and 24. In this embodiment, the four circumferential main grooves all have the same shape, and these circumferential main grooves 2 ensure the drainage performance of the tire.

In the example illustrated in FIG. 1, the four circumferential main grooves 2 are provided symmetrically with respect to the tire equatorial plane CL, with two in each of the tread width direction halves divided by the tire equatorial plane CL.

Furthermore, as illustrated in FIG. 1, a plurality of land portions 3 are defined by the four circumferential main grooves 2 and tread edges TE1 and TE2. Specifically, an outermost land portion 31 at one side in the tread width direction is defined by the outermost circumferential main groove 21 at one side in the tread width direction and the tread edge TE1 at one side, an intermediate land portion 32 at one side is defined by the outermost circumferential main groove 21 and the circumferential main groove 22 provided adjacent thereto on the other side of the outermost circumferential main groove 21 in the tread width direction, a central land portion 33 positioned on the tire equatorial plane CL in the illustrated example is defined by the circumferential main groove 22 and the circumferential main groove 23 provided adjacent thereto on the other side of the circumferential main groove 22 in the tread width direction, an intermediate land portion 34 at the other side is defined by the circumferential main groove 23 and an outermost circumferential main groove 24 provided adjacent thereto on the other side of the circumferential main groove 23 in the tread width direction, and an outermost land portion 35 at the other side in the tread width direction is defined by the outermost circumferential main groove 24 and the tread edge TE2 at the other side.

In the illustrated example, the outermost land portion 31 and the outermost land portion 35 are formed to have equivalent dimensions in the tread width direction. Also, the intermediate land portion 32, central land portion 33, and intermediate land portion 34 are formed to have equivalent dimensions in the tread width direction.

Lug grooves 41 on the tread edge side are formed in the outermost land portion 31 of this embodiment, with one end opening to the tread edge TE1 and the other end terminating within the outermost land portion 31.

In the intermediate land portion 32, intermediate sipes 51 extending in the tread width direction are formed at a predetermined pitch length. The intermediate sipes 51 in this embodiment are formed so that the opening width at the tread surface is 0.7 mm. The intermediate land portion 32 is continuous in the tread circumferential direction between adjacent intermediate sipes 51 without being divided by other sipes or grooves.

Lug grooves 42 are formed in the intermediate land portion 32 of this embodiment, with one end opening into the outermost circumferential main groove 21 and the other end being in communication with the intermediate sipe 51.

Furthermore, lug grooves 43 are formed in the intermediate land portion 32 of this embodiment, with one end opening into the circumferential main groove 22 and the other end terminating within the intermediate land portion 32. In this embodiment, the lug grooves 43 are formed at the center in the tread circumferential direction between adjacent intermediate sipes 51. The lug grooves 43 of this embodiment are formed to extend substantially in parallel with the intermediate sipes 51.

One end of the intermediate sipes 51 of this embodiment opens into the circumferential main groove 22. Therefore, the ends of the intermediate sipes 51 of this embodiment are in communication respectively with the circumferential main grooves 21 and 22. The intermediate land portion 32 of this embodiment is thus divided in the tread circumferential direction by the lug grooves 42 and the intermediate sipes 51 and is formed into blocks.

The intermediate sipes 51 of this embodiment are formed at an inclination relative to the tread width direction. The intermediate sipes 51 may, for example, be formed at an inclination of 10° to 50° relative to the tread width direction. By setting the inclination angle of the intermediate sipe 51 relative to the tread width direction to be within this range, the steering stability can be maintained even as a large force is applied in the tread circumferential direction and the tread width direction, and the water film in the intermediate land portion 32 can effectively be removed. The intermediate sipes 51 of this embodiment are inclined at approximately 30° relative to the tread width direction.

Figure 2:
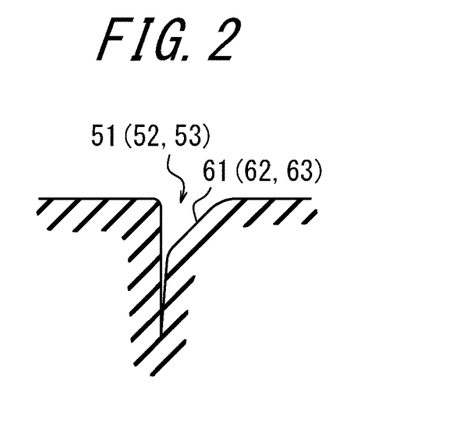
FIG. 2 is a cross-sectional diagram along the II-II line in FIG. 1.

FIG. 2 is a cross-sectional diagram along the II-II line in FIG. 1. In each intermediate sipe 51 of this embodiment, a chamfered portion 61 is formed at an opening position to the tread surface 1. In FIG. 1, the chamfered portion 61 is indicated with hatching. The intermediate sipes 51 in this embodiment are formed so that the width that opens to the chamfered portion 61 at the tread surface is 0.7 mm. As referred to here, the width of the sipe is the dimension in a direction perpendicular to the extending direction of the sipe. In this embodiment, the chamfered portion 61 is formed at the opening position to the tread surface 1 at one side of the intermediate sipes 51 in the tread circumferential direction. The chamfered portion 61 in this embodiment is configured so that the amount of chamfering increases from the circumferential main groove 21 towards the circumferential main groove 22.

In the central land portion 33 formed on the tire equatorial plan CL, central sipes 52 extending in the tread width direction are formed at a predetermined pitch length. The central sipes 52 in this embodiment are formed so that the opening width at the tread surface is 0.7 mm. The central land portion 33 is continuous in the tread circumferential direction between adjacent central sipes 52 without being divided by other sipes or grooves. The central sipes 52 are formed so that the pitch length of the intermediate sipes 51 is greater than the pitch length of the central sipes 52.

The ends of the central sipes 52 open respectively to the circumferential main grooves 22 and 23, so that the central sipes 52 divide the central land portion 33. Therefore, the central land portion 33 is formed into blocks. Like the intermediate sipes 51, the central sipes 52 of this embodiment are inclined at approximately 30° relative to the tread width direction.

Like the intermediate sipes 51, in each central sipe 52 of this embodiment, a chamfered portion 62 is formed at an opening position to the tread surface. In FIG. 1, the chamfered portion 62 is indicated with hatching. In this embodiment, as in the intermediate sipes 51, a chamfered portion 62 is formed at the opening position to the tread surface 1 at one side of the central sipes 52 in the tread circumferential direction. The chamfered portion 62 in this embodiment is configured so that the amount of chamfering increases from the circumferential main groove 22 towards the circumferential main groove 23. The chamfered portion 62 in this embodiment is configured so that the amount of chamfering thereof is greater than that of the chamfered portion 61 of the intermediate sipes 51.

In this embodiment, adjacent central sipes 52 are formed to be continuous smoothly and alternately, via the circumferential main groove 22, with the lug grooves 43 and the intermediate sipes 51 formed in the intermediate land portion 32. Therefore, in this embodiment, the pitch length of the intermediate sipes 51 is approximately twice the pitch length of the central sipes 52.

In the intermediate land portion 34, intermediate sipes 53 extending in the tread width direction are formed at a predetermined pitch length. The intermediate sipes 53 in this embodiment are formed so that the opening width at the tread surface is 0.7 mm. One end of the intermediate sipes 53 of this embodiment opens into the circumferential main groove 23. The intermediate land portion 34 is continuous in the tread circumferential direction between adjacent intermediate sipes 53 without being divided by other sipes or grooves. The intermediate sipes 53 are formed so that the pitch length of the intermediate sipes 53 is greater than the pitch length of the central sipes 52.

Lug grooves 44 (first lug grooves) are formed in the intermediate land portion 34 of this embodiment, with one end opening into the circumferential main groove 23 and the other end terminating within the intermediate land portion 34. In this embodiment, the lug grooves 44 are formed at approximately the center in the tread circumferential direction between adjacent intermediate sipes 53. The lug grooves 44 of this embodiment are formed to extend substantially in parallel with the intermediate sipes 53.

Furthermore, lug grooves 45 are formed in the intermediate land portion 34 of this embodiment, with one end opening into the intermediate sipe 53 and the other end opening into the outermost circumferential main groove 24. In this embodiment, the lug grooves 45 are formed so that the lug grooves 44 and lug grooves 45 do not overlap in the tread circumferential direction.

Furthermore, lug grooves 46 (second lug grooves) are formed in the intermediate land portion 34 of this embodiment, with one end opening into the circumferential main groove 24 and the other end terminating within the intermediate land portion 34. The lug grooves 46 of this embodiment are formed to be separated in the tread circumferential direction from the lug grooves 44 and so as not to overlap the lug grooves 44 in the tread width direction.

One end of each intermediate sipe 53 of this embodiment opens into the circumferential main groove 23, and the other end opens into the lug groove 45. Therefore, the ends of the intermediate sipes 53 of this embodiment are in communication respectively with the circumferential main grooves 23 and 24. The intermediate land portion 34 of this embodiment is thus divided in the tread circumferential direction by the lug grooves 45 and the intermediate sipes 53 and is formed into blocks. Like the intermediate sipes 51 and the central sipes 52, the intermediate sipes 53 of this embodiment are inclined at approximately 30° relative to the tread width direction.

Like the intermediate sipes 51 and the central sipes 52, in each intermediate sipe 53 of this embodiment, a chamfered portion 63 is formed at an opening position to the tread surface. In FIG. 1, the chamfered portion 63 is indicated with hatching. The intermediate sipes 53 in this embodiment are formed so that the width that opens to the chamfered portion 63 at the tread surface is 0.7 mm. In this embodiment, as in the intermediate sipes 51 and the central sipes 52, a chamfered portion 63 is formed at the opening position to the tread surface 1 at one side of the intermediate sipes 53 in the tread circumferential direction. The chamfered portion 63 in this embodiment is configured so that the amount of chamfering increases from the circumferential main groove 23 towards the circumferential main groove 24. The chamfered portion 63 in this embodiment is configured so that the amount of chamfering thereof is greater than that of the chamfered portion 62 of the central sipes 52.

The intermediate sipes 53 of this embodiment are formed to be continuous smoothly and alternately, via the circumferential main groove 23, with the central sipes 52 that, among the central sipes 52 formed in the central land portion 33, are formed to be continuous smoothly and alternately, via the circumferential main groove 22, with the lug grooves 43 formed in the intermediate land portion 32. Therefore, in this embodiment, the intermediate sipes 51 of the intermediate land portion 32 and the intermediate sipes 53 of the intermediate land portion 34 are continuous smoothly and alternately with the central sipes 52 via the circumferential main grooves 22 and 23. In this embodiment, like the pitch length of the intermediate sipes 51, the pitch length of the intermediate sipes 53 is approximately twice the pitch length of the central sipes 52.

The lug grooves 44 of this embodiment are formed to be continuous smoothly and alternately, via the circumferential main groove 23, with the central sipes 52 that, among the central sipes 52 formed in the central land portion 33, are formed to be continuous smoothly and alternately, via the circumferential main groove 22, with the intermediate sipes 51 formed in the intermediate land portion 32. Therefore, in this embodiment, the intermediate sipes 51 (including the chamfered portion 61), central sipes 52 (including the chamfered portion 62), and lug grooves 44 are formed to be continuous smoothly via the circumferential main groove 22 and the circumferential main groove 23.

Lug grooves 47 on the tread edge side are formed in the outermost land portion 35 of this embodiment, with one end opening to the tread edge TE2 and the other end terminating within the outermost land portion. In this embodiment, the lug grooves 47 on the tread edge side are formed so that the lug grooves 46 are positioned in the direction in which a portion of the lug grooves 47 on the tread edge side extend.

Furthermore, lug grooves 48 on the tire equatorial plane side are formed in the outermost land portion 35 of this embodiment, with one end opening to the outermost circumferential main groove 24 and the other end terminating within the outermost land portion 35. In this embodiment, the lug grooves 48 on the tire equatorial plane side are formed so as not to overlap in the tire width direction with the lug grooves 47 on the tread edge side. Also, the lug grooves 47 on the tread edge side and the lug grooves 48 on the tire equatorial plane side are formed to be separated in the tread circumferential direction. In this embodiment, the lug grooves 48 on the tire equatorial plane side are formed to be continuous smoothly with the lug grooves 45 via the circumferential main grooves 24. Therefore, in this embodiment, the lug grooves 43, the central sipes 52 (including the chamfered portion 62), the intermediate sipes 53 (including the chamfered portion 63), the lug grooves 45, and the lug grooves 48 on the tire equatorial plane side are formed to be continuous smoothly via the circumferential main grooves 22 to 24.

In this way, the tire according to an embodiment of this disclosure includes, on the tread surface 1, a plurality of circumferential main grooves 2 extending continuously in the tread circumferential direction and a plurality of land portions 3 defined by the circumferential main grooves 2 and tread edges TE; central sipes 52, in a central land portion 33 formed on the tire equatorial plane CL, extending in the tread width direction and being formed at a predetermined pitch length, the central land portion 33 being continuous in the tread circumferential direction between adjacent central sipes 52; and intermediate sipes 51 and 53, in intermediate land portions 32 and 34 adjacent to the central land portion 33 on both sides in the tread width direction with the circumferential main grooves 22 and 23 therebetween, extending in the tread width direction and being formed at a predetermined pitch length, each of the intermediate land portion 32 and 34 being continuous in the tread circumferential direction between adjacent intermediate sipes 51 and 53; such that the pitch length of the intermediate sipes 51 and 53 is longer than the pitch length of the central sipes 52, and both ends of the central sipes 52 open into the circumferential main grooves 22 and 23.

The following describes the effects of the tire according to this embodiment when mounting the tire onto a vehicle so that the intermediate land portion 34 at the other side is on the outside while the tire is mounted on the vehicle.

In order to improve the steering stability during cornering, rigidity with respect to the side force during cornering is required in the land portion. Therefore, it is effective to provide the land portion with a ribbed shape. Upon adopting a completely ribbed shape in the land portion near the tire equatorial plane CL where the ground contact length that greatly affects the initial steering responsiveness is the longest, however, a sufficient grounding property cannot be obtained, which may make the initial steering responsiveness insufficient.

By contrast, in the tire according to an embodiment of this disclosure, the central sipes 52 that extend in the tread width direction are formed at a predetermined pitch in the central land portion 33 formed on the tire equatorial plane CL, and both ends of the central sipes 52 open into the circumferential main grooves 22 and 23. Therefore, the grounding property of the central land portion 33 can be increased and the footprint area guaranteed, thereby improving the initial steering responsiveness. The pitch length of the intermediate sipes 51 and 53 is set to be longer than the pitch length of the central sipes 52. Therefore, the rigidity of the intermediate land portions that is necessary with respect to the side force during cornering can be guaranteed, thereby improving the steering stability during cornering.

Therefore, according to the pneumatic tire of this embodiment, the initial steering responsiveness can be made compatible with the steering stability during cornering.

In this disclosure, both ends of the intermediate sipes 51 and 53 are preferably in communication with the circumferential main grooves 21, 22 and 23, 24 respectively. Adopting such a configuration reduces the rigidity of the intermediate land portions 32 and 34, thereby reducing the difference in rigidity from the central land portion 33 and allowing an increase in ride comfort.

Also, the central sipes 52 preferably have a chamfered portion 62 at the opening position to the tread surface. Adopting such a configuration improves the drainage performance while also increasing the grounding property, thereby improving the initial steering responsiveness.

Furthermore, the intermediate sipes 51 and 53 may have chamfered portions 61 and 63 at the opening position to the tread surface. In this case, the amount of chamfering of the chamfered portion 62 of the central sipes 52 in the central land portion 33 is preferably greater than the amount of chamfering of the chamfered portion 61 of the intermediate sipes 51 in one intermediate land portion 32 adjacent to the central land portion 33 and is preferably less than the amount of chamfering of the chamfered portion 63 of the intermediate sipes 53 in the other intermediate land portion 34 adjacent to the central land portion 33. Adopting such a configuration increases the amount of chamfering at the other side, which is on the outside while the tire is mounted on the vehicle, thereby allowing an improvement in the drainage performance during cornering. Also, since the amount of chamfering is small at one side, which is on the inside while the tire is mounted on the vehicle, the footprint area during regular running can be guaranteed, thereby guaranteeing a good initial steering responsiveness.

The intermediate sipes 51 of one intermediate land portion 32 and the intermediate sipes 53 of the other intermediate land portion 34 are preferably formed to be continuous smoothly and alternately with the central sipes 52 via the circumferential main grooves 22 and 23. By adopting such a configuration, the intermediate sipes 51 and the intermediate sipes 53 can be formed at positions that are offset in the tread circumferential direction, thereby making the rigidity uniform throughout the tread and further increasing the steering stability during cornering. Furthermore, by the intermediate sipes 51 and the intermediate sipes 53 being continuous smoothly with the central sipes 52, the drainage performance can be improved.

In at least one of the intermediate land portions adjacent to the central land portion 33, i.e. in the intermediate land portion 34, lug grooves 44 and 46 are preferably formed between the intermediate sipes 53 adjacent in the tread circumferential direction, with one end opening into the circumferential main grooves 23 and 24 and the other end terminating within the intermediate land portion 34. By adopting such a configuration, the rigidity of the intermediate land portion 34 is reduced and the grounding property is improved, thereby improving the steering stability during cornering. Such lug grooves may also be formed in the intermediate land portion 32.

The lug grooves 44 and 46 preferably include a first lug groove 44 opening into the circumferential main groove 23 adjacent on the tire equatorial plane side and a second lug groove 46 opening into the circumferential main groove 24 adjacent on the tread edge side, and the first lug groove 44 and the second lug groove 46 are preferably formed to be separated in the tread circumferential direction and so as not to overlap in the tread width direction. By adopting such a configuration, an extreme reduction in the rigidity of the intermediate land portion 34 can be prevented, and the steering stability during cornering can be further increased.

Lug grooves 41 and 47 on the tread edge side are preferably formed in the outermost land portions 31 and 35 in the tread width direction defined by the circumferential main grooves 2 and the tread edges TE1 and TE2, with one end of the lug grooves 41 and 47 on the tread edge side opening to the tread edge TE1 or TE2 and the other end terminating within the outermost land portion 31 or 35. By adopting such a configuration, lug grooves can be formed without excessively reducing the rigidity of the outermost land portions 31 and 35, thereby maintaining the steering stability during cornering and improving the drainage performance.

Lug grooves 48 on the tire equatorial plane side are preferably formed in the outermost land portion 35, with one end opening into the circumferential main groove 24 and the other end terminating within the outermost land portion 35, and the lug grooves 48 on the tire equatorial plane side 48 and the lug grooves 47 on the tread edge side are preferably formed so as not to overlap in the tire width direction. By adopting such a configuration, the drainage performance and initial steering responsiveness can be further increased while maintaining the steering stability during cornering.

Embodiments of this disclosure have been described, but this disclosure is in no way limited to the above embodiments. For example, the number of circumferential main grooves formed on the tread surface may be three or may be five or more. A variety of other changes and modifications may be made.

EXAMPLES

To verify the effects of the tire disclosed herein, prototypes of tires according to Examples 1 to 9 and a tire according to Comparative Example 1 were produced, and tests were run to evaluate the performance of the tires. Table 1 below lists the specifications of each tire. The tests were performed by assembling the above tires with a tire size of 225/45R17 onto an applicable rim, applying an internal pressure of 230 kPa, and mounting the tires onto a vehicle so that the intermediate land portion 34 was on the outside while the tire was mounted on the vehicle.

<Steering Stability During Cornering>

Each of the above tires was run on a dry road surface, and the driving performance was evaluated based on the driver's sensory perception. The results were evaluated as relative values, with the evaluation result for the tire of Comparative Example 1 as 100. The larger the value is, the better the steering stability during cornering is.

<Initial Steering Responsiveness>

A sensory evaluation was performed by the driver. The results were evaluated as relative indices, with the evaluation result for the tire of Comparative Example 1 as 100. The larger the value is, the better the initial steering responsiveness is.

<Drainage Performance>

Each of the above tires was run over a wet road surface with a water depth of 6 mm on a test course, and the braking distance from the start of braking at a speed of 80 km/h until a full stop was measured. The results were evaluated as the inverse of the braking distance ratio, with the evaluation result for the tire according to Comparative Example 1 as 100. The larger the value is, the better the drainage performance is.

TABLE 1

| | Example 1 | Example 2 | Example 3 | Example 4 | Example 5 | Example 6 | Example 7 | Example 8 | Example 9 | Comparative Example 1 |
|---|---|---|---|---|---|---|---|---|---|---|
| Central land portion 33 | blocks | blocks | blocks | blocks | blocks | blocks | blocks | blocks | blocks | ribbed shape |
| Intermediate sipes 51 and 53 and circumferential main grooves | continuous | continuous | continuous | continuous | continuous | continuous | continuous | continuous | not continuous | not continuous |
| Chamfered portion 62 | provided | provided | provided | provided | provided | provided | provided | not provided | not provided | not provided |
| Chamfered portions 61 and 63 | provided | provided | provided | provided | provided | provided | not provided | not provided | not provided | not provided |
| Intermediate sipes 51 and 53 and central sipe 52 | smoothly continuous | smoothly continuous | smoothly continuous | smoothly continuous | smoothly continuous | not continuous | not continuous | not continuous | not continuous | not continuous |
| Lug grooves 44 | provided | provided | provided | provided | not provided | not provided | not provided | not provided | not provided | not provided |
| Lug grooves 45 | provided | provided | provided | not provided | not provided | not provided | not provided | not provided | not provided | not provided |
| Lug grooves 41 and 47 | provided | provided | not provided | not provided | not provided | not provided | not provided | not provided | not provided | not provided |
| Lug grooves 48 | provided | not provided | not provided | not provided | not provided | not provided | not provided | not provided | not provided | not provided |
| Steering stability during cornering | 120 | 120 | 120 | 115 | 110 | 108 | 108 | 106 | 103 | 100 |
| Initial steering responsiveness | 115 | 113 | 113 | 113 | 113 | 113 | 108 | 106 | 103 | 100 |
| Drainage performance | 115 | 112 | 107 | 106 | 106 | 104 | 103 | 103 | 102 | 100 |

As illustrated in Table 1, the initial steering responsiveness and the steering stability during cornering were made more compatible in the tires according to Examples 1 to 9 than in the tire according to Comparative Example 1.

It is clear that the initial steering responsiveness and the steering stability during cornering cannot be made compatible in Comparative Example 1 as in Examples 1 to 9 due to the central land portion 33 having a ribbed shape.

A comparison of Example 1 and Example 2 shows that Example 1, in which the lug grooves 48 on the tire equatorial plane side are formed, has higher drainage performance and initial steering responsiveness while maintaining the steering stability during cornering.

A comparison of Example 2 and Example 3 shows that Example 2, in which the lug grooves 41 and 47 on the tread edge side are formed, has higher drainage performance.

A comparison of Example 3 and Example 4 shows that Example 3, in which the lug grooves 45 are formed, has higher steering stability during cornering.

A comparison of Example 4 and Example 5 shows that Example 4, in which the lug grooves 44 are formed, has higher steering stability during cornering.

A comparison of Example 5 and Example 6 shows that Example 5, in which the intermediate sipes 51 and the intermediate sipes 53 are continuous smoothly with the central sipes 52, has higher steering stability during cornering and drainage performance.

A comparison of Example 6 and Example 7 shows that Example 6, in which the chamfered portions 61 and 63 are formed in the intermediate sipes 51 and 53, has higher drainage performance and initial steering responsiveness.

A comparison of Example 7 and Example 8 shows that Example 7, in which the chamfered portion 62 is formed in the central sipes 52, has higher steering stability during cornering and initial steering responsiveness.

A comparison of Example 8 and Example 9 shows that Example 8, in which the intermediate sipes 51 and 53 are continuous with the circumferential main grooves, has higher steering stability.

INDUSTRIAL APPLICABILITY

According to this disclosure, it is possible to provide a pneumatic tire that makes the initial steering responsiveness compatible with the steering stability during cornering.

REFERENCE SIGNS LIST

1 Tread surface
2 Circumferential main groove
21 Outermost circumferential main groove
22, 23 Circumferential main groove
24 Outermost circumferential main groove
3 Land portion
31 Outermost land portion
32 Intermediate land portion
33 Central land portion
34 Intermediate land portion
35 Outermost land portion
41 Lug groove on tread edge side
42, 43 Lug groove
44 Lug groove (first lug groove)
45 Lug groove
46 Lug groove (second lug groove)
47 Lug groove on tread edge side
48 Lug groove on tire equatorial plane side
51 Intermediate sipe
52 Central sipe
53 Intermediate sipe
61, 62, 63 Chamfered portion
CL Tire equatorial plane
TE1, TE2 Tread edge

The invention claimed is:

1. A pneumatic tire comprising:
on a tread surface, a plurality of circumferential main grooves extending continuously in a tread circumferential direction and a plurality of land portions defined by the circumferential main grooves and tread edges;
central sipes, in a central land portion formed on a tire equatorial plane, extending in a tread width direction and being formed at a predetermined pitch length, the central land portion being continuous in the tread circumferential direction between adjacent central sipes; and
intermediate sipes, in intermediate land portions adjacent to the central land portion on both sides in the tread width direction with the circumferential main grooves therebetween, extending in the tread width direction and being formed at a predetermined pitch length, each intermediate land portion being continuous in the tread circumferential direction between adjacent intermediate sipes;
wherein the pitch length of the intermediate sipes is longer than the pitch length of the central sipes;
wherein both ends of the central sipes open into the circumferential main grooves;
wherein the central sipes have a chamfered portion at an opening position to the tread surface;
wherein the intermediate sipes have a chamfered portion at an opening position to the tread surface; and
wherein an amount of chamfering of the chamfered portion of the central sipes in the central land portion is greater than an amount of chamfering of the chamfered portion of the intermediate sipes in one intermediate land portion adjacent to the central land portion and is less than an amount of chamfering of the chamfered portion of the intermediate sipes in another intermediate land portion adjacent to the central land portion.

2. The pneumatic tire of claim 1, wherein both ends of the intermediate sipes are in communication with the circumferential main grooves.

3. The pneumatic tire of claim 1, wherein the intermediate sipes of the one intermediate land portion and the intermediate sipes of the other intermediate land portion are formed to be continuous smoothly and alternately with the central sipes via the circumferential main grooves.

4. The pneumatic tire of claim 1, wherein in at least one of the intermediate land portions adjacent to the central land portion, lug grooves are formed between the intermediate sipes adjacent in the tread circumferential direction, with one end opening into the circumferential main groove and another end terminating within the intermediate land portion.

5. The pneumatic tire of claim 4,
wherein the lug grooves comprise a first lug groove opening into the circumferential main groove adjacent on the tire equatorial plane side of the intermediate land portion and a second lug groove opening into the circumferential main groove adjacent on the tread edge side of the intermediate land portion; and
wherein the first lug groove and the second lug groove are formed to be separated in the tread circumferential direction and so as not to overlap in the tread width direction.

6. The pneumatic tire of claim 1, wherein lug grooves on the tread edge side are formed in an outermost land portion in the tread width direction defined by the circumferential main groove and the tread edge, with one end of each lug groove on the tread edge side opening to the tread edge and another end terminating within the outermost land portion.

7. The pneumatic tire of claim 6,
wherein lug grooves on the tire equatorial plane side are formed in the outermost land portion, with one end opening into the circumferential main groove and another end terminating within the outermost land portion; and wherein the lug grooves on the tire equatorial plane side and the lug grooves on the tread edge side are formed so as not to overlap in a tire width direction.

* * * * *